Patented Mar. 20, 1923.

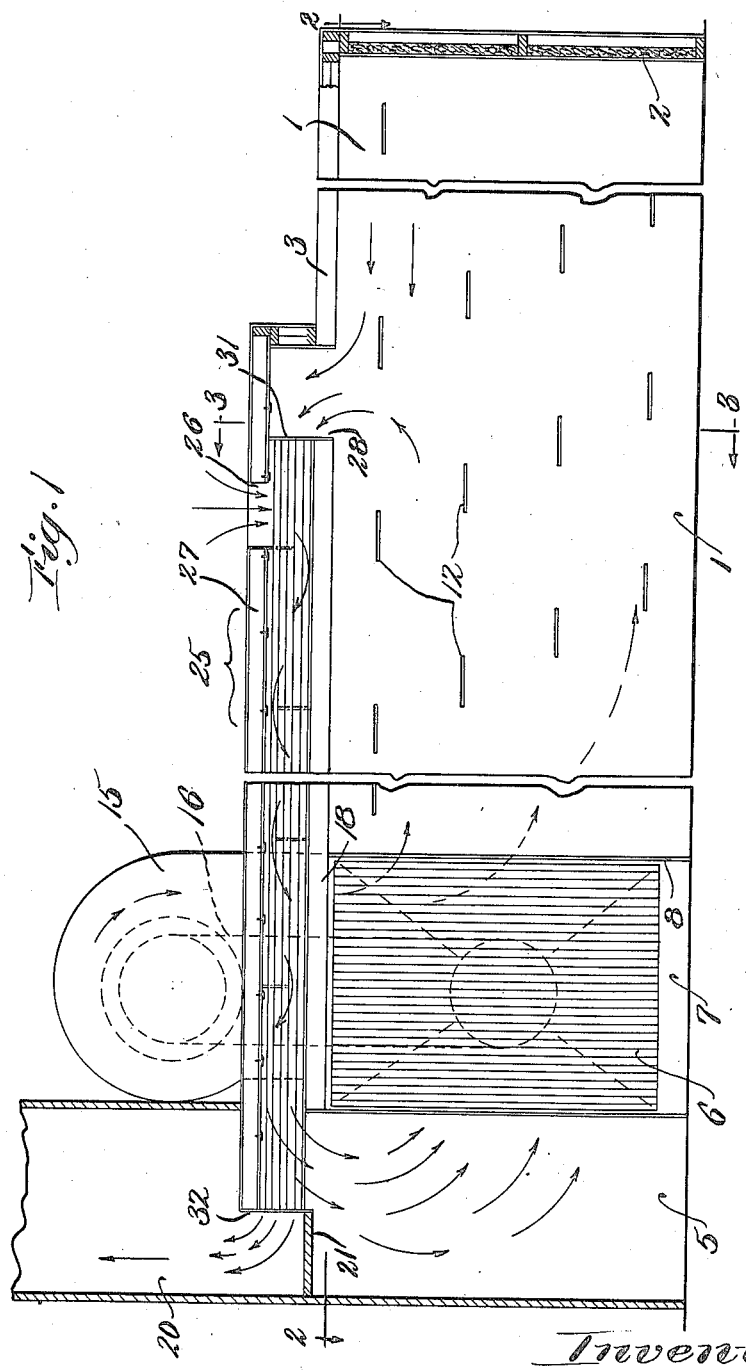

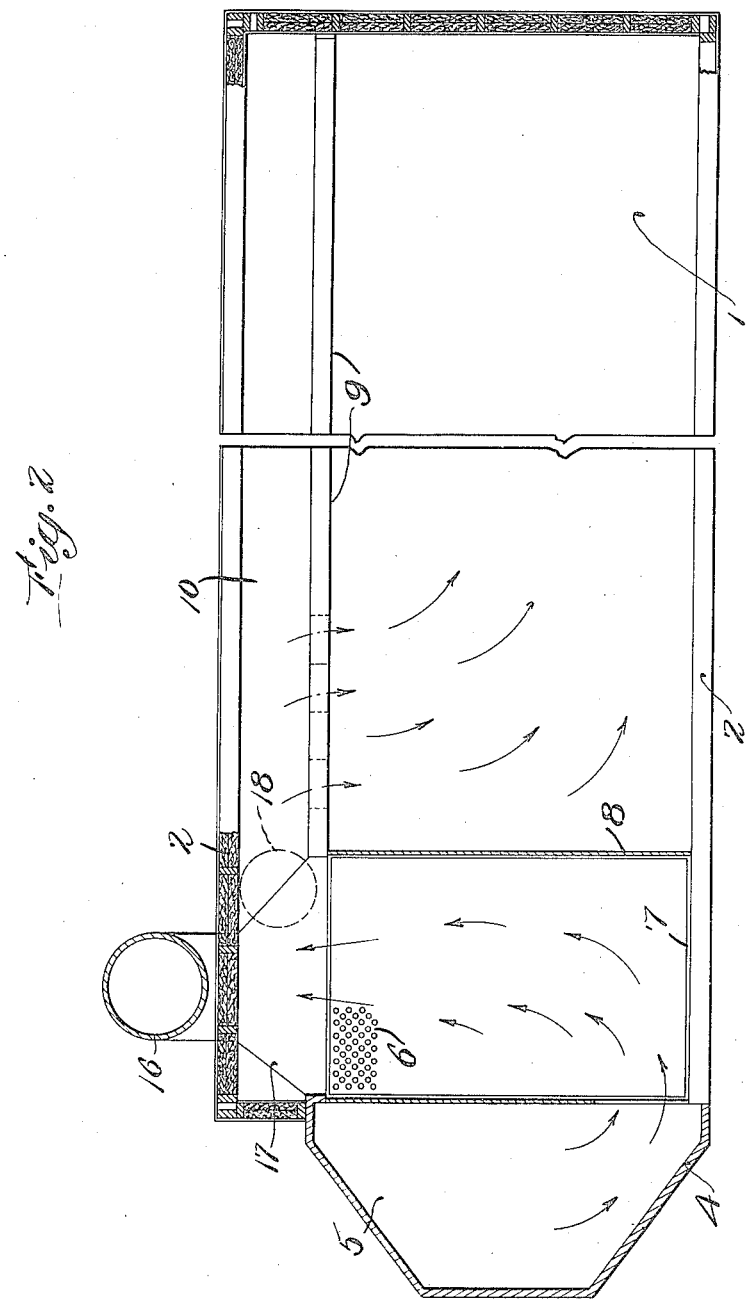

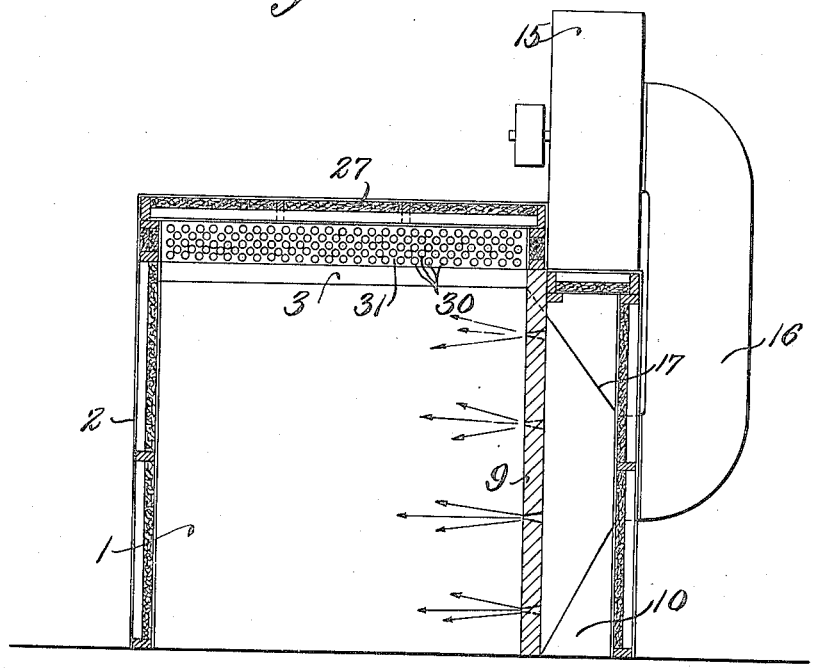

1,448,887

UNITED STATES PATENT OFFICE.

JOSEPH H. WALSH, OF BOSTON, MASSACHUSETTS, ASSIGNOR TO JOHNS-MANVILLE. INCORPORATED, OF NEW YORK, N. Y., A CORPORATION OF NEW YORK.

DRIER.

Application filed June 12, 1922. Serial No. 567,679.

*To all whom it may concern:*

Be it known that I, JOSEPH H. WALSH, a citizen of the United States of America, and resident of Boston, in the county of Suffolk and State of Massachusetts, have invented new and useful Improvements in Driers, of which the following is a specification.

This invention relates to driers and particularly to driers adapted to evaporate moisture from difficult objects, such as cocoa-fibre mats at a moderate temperature and with a minimum expenditure of heat and mechanical energy.

A principal object of the invention is to provide an organization comprising an insulated chamber, air circulation means, and heating means so constructed and arranged as to speedily effect drying in one operation of a considerable charge of such difficult objects as wet cocoa-fibre mats, the construction including means for conserving the heat energy supplied by a suitable heater and the mechanical energy required for circulation.

A preferred form of the apparatus is illustrated in the accompanying drawings, in which,—

Fig. 1 is a vertical longitudinal section centrally through the drying chamber;

Fig. 2 is a plan partly in section on the line 2—2 of Fig. 1; and

Fig. 3 is a cross section on the line 3—3 of Fig. 1.

The drier may comprise a treatment chamber 1 having insulated side walls 2 and top 3, the whole enclosing a space of any convenient shape, for instance a rectangular space much longer than it is wide or high, as shown. One end 4 may be rounded or cut off diagonally to comprise a fresh air chamber 5 communicating with a heater 6 in a chamber 7 set off from the space 1 by a partition 8. A longitudinal partition 9 at one side of the chamber 1 and of its full height divides off a plenum chamber 10. The partition 9 is provided with a properly distributed large number of relatively narrow hot-air distributing slots 12 affording means for blowing a current from the plenum chamber 10 into the drying chamber 1 whenever a positive pressure is maintained in chamber 10, or a negative pressure in chamber 1, or both.

Means for maintaining these relative pressures may comprise a fan 15 connected on its intake side by a pipe 16 and funnel 17 with the heater 6, and through it, with chamber 5. Preferably fan 15 is mounted above the chamber 10 and the educt end of the fan casing communicates directly with the chamber 10 at 18, as shown best in Figs. 1 and 2.

The fresh-air chamber 5 is divided from an exhaust chimney 20 by a horizontal partition 21, Fig. 1, and by one end of a heat-interchange economizer 25 arranged on the top of the heating chamber.

The economizer may comprise any preferred arrangement by which a fresh air current flowing in, for example at the opening 26 in a top insulating cover 27, is caused to pass in radiating relation or contact with the outer sides of flues in which the exhaust air flowing from chamber 1, for example through the hole 28 in its top 3, is caused to pass.

In the preferred form shown, the flues 30 extend from and through an end wall 31 to an end wall 32 communicating with chimney 20, and between these walls pass through baffles 33 arranged to cause a current flowing from inlet opening 2 to an opening 34 into chamber 5 repeatedly to pass across the flues 30.

The material to be dried, e. g., cocoa-fibre mats is suitably arranged in chamber 1, generally on horizontal racks on trucks, in a way old in the use of dry-kilns, and not shown.

The blasts from the openings 12 enter between layers of the material everywhere, and induce a strong draft of initially fresh hot air between and against all layers, the spent air rapidly exhausting through opening 28 in the top of chamber 1, and through flues 30, from which it gives up a great part of its heat to the incoming air.

It will be observed that the arrangement of the apparatus is such as to conserve heat by insulation, by the proper proximity of the primary heating means to the drying chamber, and by the proximity of the econo-mizer to the drying chamber, and by utilizing heat of the exhaust air to preheat the new air. This combined with effective circulation secures great gains in time and in the quantity of heat required to dry the material over any of past practices of which I am aware.

I claim:

1. A drier comprising a drying chamber, a heating chamber, and a heater therein, said drying chamber having heat-insulated walls, one of which is perforated to constitute air-delivery ducts, and auxiliary chambers adjacent to the drying chamber and comprising heat-insulated compartments of which one, adapted for use as plenum chamber, is defined on one side by said perforated wall; and of which another, constituting an economizer device, is provided with a series of flues communicating respectively with the drying chamber and with the outer air, the said economizer chamber having an inlet opening communicating with the outer air and an outlet opening communicating with said heating chamber, in combination with suitable flues and means for delivering incoming air from within the heating chamber to said plenum chamber and thence to said drying chamber.

2. A drier comprising a drying chamber having heat-insulated walls, a heating chamber and heating means therein within said drying chamber, heat-insulating walls defining auxiliary chambers exterior of and adjacent to the drying chamber, one of said auxiliary chambers being a plenum chamber separated from the drying chamber by a wall having therein a plurality of delivery openings, and another of said chambers being provided with a series of flues communicating respectively with the drying chamber and with the outer air, the said chamber having an inlet opening communicating with the outer air and an outlet opening communicating with said heating chamber, in combination with suitable flues and a fan for delivering air from within the heating chamber to said plenum chamber and thence to said drying chamber.

3. A drier comprising a drying chamber having heat-insulated walls, auxiliary chambers extending longitudinally of the drying chamber and comprising heat-insulated compartments of which one, adapted for use as a plenum chamber, extends throughout the length of the drying chamber and communicates therewith through a plurality of openings; and of which another, constituting an economizer device, is provided with a series of flues communicating respectively with the drying chamber and with the outer air, the said economizer chamber having an inlet opening communicating with the outer air and an outlet opening communicating with a heating chamber within the heat-insulated drying chamber, in combination with heating means in said heating chamber, suitable flues, and a fan for delivering air from within the heating chamber to said plenum chamber and thence to said drying chamber.

4. In a drier comprising a drying chamber having heat-insulated walls, heat-insulated walls defining auxiliary chambers extending longitudinally of the drying chamber and comprising a plenum chamber, and an economizer chamber forming a part of an economizer device provided with a series of flues communicating respectively with the drying chamber and with the outer air, the said economizer chamber having an inlet opening communicating with the outer air and an outlet opening communicating with a heating chamber within and at one end of the heat-insulated drying chamber, a waste-air eduction chimney into which said economizer flues deliver at a point above the heating chamber; in combination with suitable flues and a fan for delivering air from within the heating chamber to said plenum chamber and thence to said drying chamber.

Signed by me at Boston, Massachusetts, this 2nd day of June, 1922.

JOSEPH H. WALSH.